United States Patent Office 3,655,882
Patented Apr. 11, 1972

3,655,882
STABLE DIETARY SUPPLEMENT FOR NEW BORN PIGS
Kenneth N. Wright and Samuel H. Shanklin, Decatur, Ill., assignors to A. E. Staley Manufacturing Company, Decatur, Ill.
No Drawing. Filed Aug. 26, 1968, Ser. No. 755,450
Int. Cl. A61k 27/00, 15/00, 21/00
U.S. Cl. 424—147
5 Claims

ABSTRACT OF THE DISCLOSURE

A stable, substantially anhydrous, water-dispersible dietary supplement for supplying supplemental iron antibiotics and vitamins to newborn pigs which comprises a substantially anhydrous, premixed formula including an iron salt such as ferric ammonium citrate, an antibiotic such as neomycin sulfate, a vitamin mineral supplement, and a substantially anhydrous dextrose sweetener. The complete premixed formula is a substantially water-free mixture having an excellent shelf life, but which is readily dispersed in the newborn pig's drinking water for voluntary consumption in amounts sufficient to treat iron deficiency anemia, supplement vitamin requirements and to minimize scours.

---

This invention relates to a stable, dry, water-dispersible, water-additive for preventing iron deficiency anemia and for controlling scours in baby pigs.

DISCLOSURE OF INVENTION

It has been known that when baby pigs are raised in confinement, access to a natural source of iron is virtually eliminated and iron deficiency anemia can result. When anemia develops in an animal, such animals are more susceptible to environmental diseases such as pneumonia and infectious scours. This problem can then lead to even more serious complications.

Studies indicate that pigs are born with a reserve amount of iron of up to about 50 mg. and that newborn pigs normally need at least 15 mg. of iron each day to sustain normal body functions and growth. In most cases, a baby pig will receive only about 1 mg. of its daily requirement of iron from the sow's milk. This fact explains, to some degree, why baby pigs which are raised in confinement usually show signs of anemia within 4 days of age. To overcome this problem, swine raisers give a supplementary iron source to the baby pig until it is capable of consuming adequate amounts of feed containing iron on its own through a balanced feed program. Since dry iron sources generally are non-palatable to baby pigs and the baby pigs consequently refuse to eat them, the supplementary iron usually is administered by injection. The injection approach is not totally satisfactory as it is time-consuming, expensive, and causes stress due to handling. In addition, muscle discoloration and even abscesses can develop due to the use of unclean needles.

In addition to protection against iron deficiencies, baby pigs also require a high degree of protection against scours and the effects of vitamin deficiencies, particularly during the first few critical days of life. The sow's colostrum is a rich source of protective antibodies during the first few hours of the pig's life. However, after that period, the sow's milk gives very little natural protection against scours. In most cases, antibiotics are given to the baby pigs to remedy this problem. Generally, antibiotics are administered after the fact, that is, after the pig has developed scours or other disease symptoms at this early age. This approach is generally expensive since the antibiotics must be administered either orally or by injection. When a pig has been infected with scours, excessive loss of body fluids and nutrients generally follows leaving the pig in a dehydrated condition. Since the baby pig cannot obtain sufficient water to overcome this state of dehydration from the sow's milk, high death losses often occur. Treatment of a pig under these circumstances generally consists of administering to the pig effective amounts of water and antibiotic to counteract dehydration and the disease.

In a recent article by B. J. Harmon in Feed Management, September 1967, a convenient method is suggested for providing a baby pig with the necessary amounts of water, iron, vitamins, antibiotics and other nutrients to minimize iron anemia, scours and dehydration. This article reports that a composition containing certain nutrients can be administered to a baby pig through its drinking water. This article teaches the advantage of this approach over pills, pastes, injections and other techniques. The report shows that the use of a particular type of water supplement increases the hemoglobin level of baby pigs and consequently their chance for survival.

Compositions of the type disclosed in the Harmon article, however, suffer from several major disadvantages. Initially, as in the case of solid iron sources, they in general are unpalatable to baby pigs. Another problem stems from the fact that they usually are unstable and cannot be stored for extended periods without undergoing undesirable decomposition, as evidenced by the composition discoloring, cakes, and finally solidifying. Discolored product is unsaleable. In use, when caking and solidification occurs, dosage measurement is difficult and product recovery may even necessitate destruction of the container in which the composition is packaged. Numerous means have been tested in an attempt to overcome such problems of discoloration and caking. Heretofore, none, however, proved completely satisfactory, and the search has continued in the art for a more palatable and stable formulation for use in treating and controlling iron deficiency anemia and scours in baby pigs.

Accordingly, the prime object of the present invention is to provide an improved formulation for use in the oral administration of iron and antibiotics to young pigs. Another object of the present invention is to provide an adequately stable, dry, free-flowing, water-soluble composition useful in treating and controlling iron deficiency anemia and scours in baby pigs. Still another object of the present invention is to provide a composition having the aforesaid properties and which, in addition, is palatable enough for administration to baby pigs via a self-fed watering program. Other objects and advantages of the invention will be apparent from the following disclosure.

In accordance with the present invention, it was discovered that compositions of the type disclosed in the above-mentioned Harmon article are rendered more palatable by an addition, preferably in a major proportion, of a sugar, and in particular dextrose. It also was found that, although a sugar addition initially further aggravates the stability problem, the tendency of the compositions toward decomposition is obviated by maintaining the formulation moisture content below certain critical limits. More specifically, it was discovered that, contrary to what heretofore was believed, water-soluble iron compounds, antibiotics, vitamins, and mineral can be combined to yield a stable formulation, providing formulation moisture content is maintained below about 2%, preferably below about 1.5%, dry substance weight basis. It will be understood that the phrase "dry substance weight" as employed herein is intended to refer to the weight of a formulation resulting after heating at a temperature of 100° F. under vacuum for four hours. The ability of the compositions to exhibit resistance toward decomposition, discoloration, and caking does depend upon somewhat special handling being required, i.e. they must be stored in an air-tight container.

This, however, is not a difficult requirement to meet and the advantages far outweight any inconvenience prompted by it. It is typical of the preferred embodiments of the present formulations, when they are stored in an air-tight container at 90° F., for example, to retain their color and free-flowing properties for time periods of over one year. Advantageously, the compositions of the present invention proved also to have excellent palatability to baby pigs.

Broadly described, the compositions of the present invention are dry, free-flowing, stable mixtures of water-dispersible, mutually compatible ingredients assimilable by baby pigs comprising (a) an iron compound, (b) an antibiotic, (c) essential vitamins, (d) essential minerals, and (e) a sugar.

It will be understood that the term "dry" as used herein is intended to refer to formulations which are dry in the visual and tactile sense. The phrase "mutually compatible" as employed herein is intended to indicate the ingredients of the combinations are essentially inert to one another and to describe mixtures of ingredients wherein there is no discernible decomposition, co-reaction, or agglomeration of material either while the mixtures are maintained in dry form or after they are dispersed in water. It further will be understood that the term "essential" as employed herein in relation to vitamin and mineral ingredients is intended to refer to nutrients which are necessary to proper functioning of baby pig's metabolic system.

The relative proportions of ingredients in particular formulations of the invention depend primarily upon the interrelated factors of the efficacy, the solubility, and palatability of the various ingredients, as well as the rate contemplated for administering the formulations in the drinking water solutions provided for the baby pigs. In general, advantageous results have been obtained with formulations comprising, on a dry substance weight basis, and iron compound in an amount corresponding to an elemental iron content of at least about 0.5 part, preferably in the range of from about 0.5 to about 2 parts, per 100 parts total formulation, from about 0.5 to about 5 parts antibiotic per part elemental iron, at least an amount of sugar imparting a sweetness comparable to an addition to the formulation of 50 parts anhydrous dextrose per 100 parts total formulation, and water in an amount of less than about 2 parts per 100 parts total formulation. From the water consumption rates of baby pigs, such formulations, in general, provide the desired control and treatment when added in baby pigs' drinking water at concentrations of from about 1 to about 5 grams per 100 milliliters.

With regard to specific ingredients, ferric ammonium citrate constitutes the water-soluble iron compound preferred for use in the formulations of the present invention. Neomycin, generally available as Neomycin sulfate, provides the preferred antibiotic additive. The sugar preferred for utilization is anhydrous dextrose. Other water-soluble or dispersible iron compounds, such as ferrous sulfate and ferric pyrophosphate; antibiotics, such as oxytetracycline; and sugars, such as sucrose and lactose, may be substituted in whole or in part for the corresponding materials specifically mentioned so long as the substituted materials are mutually compatible in the dry formulations and in the ultimate aqueous solutions with the other ingredients present. On the whole, hydrated compounds are to be avoided. The more loosely the water of hydration is bound the more the avoidance. Hydrates can be added, however, consistent with maintaining the formulation moisture content within the described levels.

The antibiotic in the formulations of the invention causes them, in use, to have a deleterious effect on some microorganisms in the digestive tract of the baby pigs being treated. Certain of these affected microorganisms normally function to supply the pig with vitamins and other nutrient materials essential to proper metabolism in the animal. Accordingly, a prime factor in the success achieved by the use of the formulations of the instant invention stems from an inclusion of a supply of essential vitamins and minerals therein to provide the animal with a supply of such materials during the period in which the antibiotic is active in the digestive tract.

The particular vitamins and minerals added to the formulations of the present invention generally are those employed in conventional vitamin-mineral supplements administered to pigs including vitamin A, vitamin $B_{12}$, vitamin $D_2$, vitamin E, and vitamin K, niacin, riboflavin, pantothenic acid, thiamine, copper, phosphorous, calcium, and other trace minerals. Whichever combination of nutrients is used, it is essential that these materials be compatible with the iron and the antibiotic material used both in the dry state or when dissolved or dispersed in water.

With regard to vitamins and minerals the compositions of the present invention typically are formulated to yield the following minimum analysis per pound formulation, as is basis, iron also being included for comparison purposes:

| Ingredient | Broad | Preferred |
| --- | --- | --- |
| Iron, milligrams | 3,000 | 5,000 |
| Copper, milligrams | 100 | 200 |
| Vitamin A, USP units | 300,000 | 600,000 |
| Vitamin $D_2$, USP units | 100,000 | 200,000 |
| Vitamin E, IU | 150 | 300 |
| Vitamin K, milligrams | 250 | 500 |
| Riboflavin, milligrams | 300 | 600 |
| d-Pantothenic acid, milligrams | 2,000 | 3,600 |
| Niacin, milligrams | 3,000 | 6,000 |
| Vitamin $B_{12}$, mcg | 1,500 | 3,000 |

Other adjuvants optionally can be added. These include effective amounts of coloring agents, antioxidants, ultraviolet absorbers, other preservatives, additional flavoring agents, additional pharmaceuticals, enzymes and the like. The only requirement is that such supplemental materials not upset the compatibility of the formulations in the dry state or when dispersed in water. Preservatives such as sodium benzoate, sodium propionate, sodium bisulfite, and methylparaben added at levels ranging up to about 5% by weight of the total formulation, have proved to be especially useful as supplemental additives in further improving the stability properties of the instant formulations.

The compositions of the invention suitably may be prepared by mixing the various ingredients dry in any order. Formulation should, however, take place in a substantially moisture free environment of controlled low humidity. Once formulated, the compositions either should be used immediately or stored in an essentially moisture-tight container. Stored as such, they have excellent stability.

In use, the formulations simply need be added to the drinking water of baby pigs. The actual administration rates may vary depending upon the potency of the formulations and the consumption rates of the particular pigs in question. Based on average water consumption rates of newborn pigs, a formulation having, for example, a guaranteed minimum analysis similar to the preferred formulations listed hereinabove generally provide satisfactory control of iron anemia and scours when added to the drinking water in amounts of from about 2 to about 3 grams per 100 milliliters.

The invention having been generally described, the following examples are provided to demonstrate specific embodiments thereof. It will be understood the examples are given by way of illustration and not by way of limitation.

EXAMPLE 1

A composition for addition to water was prepared by dry mixing the indicated ingredients to provide the levels shown.

| Ingredient: | | Approximate level total formulation per pound |
|---|---|---|
| Vitamin A (as palmitate) | U.S.P. units | 600,000 |
| Vitamin D$_2$ (irradiated 7-dehydrocholesterol) | U.S.P. units | 200,000 |
| Vitamin E (d-alpha-tocopherol) | I.U. | 320 |
| Menadione sodium bisulfiate | mg | 500 |
| Thiamine (thiamine hydrochloride) | mg | 200 |
| Riboflavin | mg | 600 |
| d-Calcium pantothenate | mg | 4,000 |
| Nicotinic acid | mg | 6,000 |
| Vitamin B$_{12}$ | mcg | 3,000 |
| Iron (ferric ammonium citrate) | mg | 5,180 |
| Copper (coper sulfate) | mg | 220 |
| Neomycin base (Neomycin sulfate) | gm | 5 |
| Dextrose (anhydrous) | gm | 325–350 |

The formulation was a dry, free-flowing powder having a moisture content of about 1.3%, dry substance basis. Samples of the formulation were placed in moisture-tight containers and stored at ambient room temperatures for one year. At the end of this period the samples had retained their color and free-flowing properties.

Samples of the above compositions were fed to baby pigs in an amount of about 2.5 gms. of the composition per 100 milliliters of drinking water.

The effect this composition had on pigs tested is reported in Table I below:

TABLE

| Treatment | Initial number of pigs | Hemoglobin, gm/100 ml. | | | Percent survival 2-21 days | Body weight, lbs. | | | Water cons., ml. per pig daily | |
|---|---|---|---|---|---|---|---|---|---|---|
| | | Initial | 10 days | 21 days | | Initial | 14 days | 21 days | 7 days | 21 days |
| 1........ Control (20 litters),[5] water........... | 210 | 9.8 | 11.0 | 13.24 | 89.1 | 3.0 | 7.2 | 8.9 | 44 | 130 |
| 2........ Experimental (18 litters), water and composition: | | | | | | | | | | |
| Not injected.................. | 86 | 9.9 | 9.8 | 11.9 | 95.3 | 3.0 | 7.6 | 9.9 | | |
| +Injection [2]................... | 87 | 9.8 | 11.5 | 13.7 | 97.8 | 2.9 | 8.2 | 9.7 | | |
| Average................. | | 9.7 | 10.6 | 12.8 | 96.5 | 3.0 | 7.9 | 9.8 | 65 | 173 |

[5] All pigs injected with 200 milligrams of iron.
[2] Injected pigs received 200 milligrams of iron.

EXAMPLE 2

In order to determine the effect of varying the moisture content of the compositions of the invention various amounts of free water were added to samples of the formulation of Example 1 as shown in Table II below. The samples then were heated and any changes noted after the indicated time periods. The results of the tests are listed in the table where the following coding is used to describe the condition of the treated sample: 0-no change; 1-moist; 2-sticky; 3-gummy; and 4-liquid.

TABLE II

| Added water, percent[1] | Heating inclosed container at 150° F. for— | | | | | |
|---|---|---|---|---|---|---|
| | 1 min. | 5 min. | 10 min. | 30 min. | 60 min. | 12 hours |
| 0 | 0 | 0 | 0 | 0 | 0 | 0 |
| 0.5 | 1 | 1 | 1 | 1 | 3 | 3 |
| 1.0 | 1 | 1 | 1 | 2 | 3 | 3 |
| 2.0 | 1 | 1 | 1 | 3 | 3 | 3 |
| 4.0 | 1 | 1 | 2 | 3 | 3 | 3 |
| 8.0 | 1 | 2 | 3 | 3 | 3 | 3 |
| 15.0 | 4 | 4 | 4 | 4 | 4 | 4 |

[1] Total weight basis.

The results demonstrated the improved stability against caking of the compositions, of the invention containing a controlled moisture content. These tests also clearly show that the preferred embodiments of the formulations having a moisture content of below about 1.5%, dry substance basis, have still further improved stability.

EXAMPLE 3

Another composition of the present invention is prepared by dry mixing the indicated ingredients in the listed amounts in a dry environment of low relative humidity.

| Ingredient | Parts by weight | Approximate level per pound total formulation |
|---|---|---|
| Iron (ferric ammonium citrate) | 35.0 | 5,338 mg. |
| Copper (copper sulfate) | 1.0 | 250 mg. |
| Neomycin base (neomycin sulfate) | 10.6 | 5.3 gm. |
| Dextrose, anhydrous | 318 | 318 gm. |
| Vitamin A (palmitate; 250,000 U.S.P. units/gm.). | 3.0 | 750,000 U.S.P. units. |
| Vitamin D$_2$ (irradiated 7-dehydrocholesterol; 200,000 U.S.P. units/gm.). | 2.0 | 400,000 U.S.P. units. |
| Vitamin E (d-alpha-tocopherol; 150,000 I.U./lb.). | 1.2 | 400 I.U. |
| Menodione sodium bisulfite (90%) | 0.7 | 500 mg. |
| Thiamine (thiamine hydrochloride; 333,000 I.U./gm.) | 1.0 | 200 mg. |
| Riboflavin | 0.8 | 750 mg. |
| d-Calcium pantothenate | 12.0 | 4,600 mg. |
| Nicotinic acid | 7.6 | 7,500 mg. |
| Vitamin B$_{12}$ | 3.0 | 3,750 mg. |
| Sodium benzoate | 18.0 | |
| Methylparaben | 20.0 | |
| Sodium propionate, 99% | 20.0 | |
| Sodium bisulfite | 4.0 | |

NOTE.—Sodium benzoate, methylparaben, sodium propionate, and sodium bisulfite were added as preservatives.

The mixture is a dry, free-flowing powder having properties similar to the composition of Example 1.

Further embodiments of this invention which do not depart from the spirit and scope thereof, of course, will be apparent to those skilled in the art; accordingly, the foregoing is to be interpreted as illustrative only and the invention will be understood to be limited only by the scope of the appended claims.

What is claimed is:

1. A dietary supplement for providing supplemental iron, antibiotics and vitamins to newborn pigs from birth to weaning age in a palatable and stable dispersion upon mixing a premixed formula of dry ingredients with water, said premixed formula comprising:

(a) an iron supplement consisting of substantially anhydrous, water-dispersible iron salt selected from the group consisting of ferric ammonium citrate, ferrous sulfate, and ferric pyrophosphate assimilable by newborn pigs corresponding to a content of elemental iron in the range of about 0.5 to about 2 parts per 100 parts of said dry premixed ingredients to insure adequate dietary iron;

(b) a water-soluble, pulverulent antibiotic composition selected from the group consisting of neomycin sulfate and oxytetracycline capable of forming a stable aqueous dispersion with said iron salt, said antibiotic composition being present in the range of from about 0.5 to about 5 parts per part of elemental iron;

(c) a water-dispersible, pulverulent dietary vitamin-mineral supplement for supplementing the vitamin-mineral requirements of newborn pigs; and (d) a substantial portion of substantially anhydrous dextrose sweetener having less than about 2% moisture, dry substance basis, for providing taste appeal and nutritional supplement to newborn pigs when said premixed formula is dispersed in water and assimiliated by newborn pigs, said premixed formula having a total moisture content prior to mixing with water of less than about 2%, dry substance basis.

2. The dietary supplement of claim 1, in which the vitamin-mineral supplement constituent comprises the following:

Vitamin A—300,000 USP units,
Vitamin $D_2$—100,000 USP units,
Vitamin E—150 I.U.,
Vitamin K—250 mg.,
Riboflavin—300 mg.,
d-Pantothenic acid—2,000 mg.,
Niacin—3,000 mg.,
Vitamin $B_{12}$—1,500 mcg.

3. The dietary supplement of claim 1, including a preservative to prolong efficacy of the formula when dispersed in water, said preservative being selected from the group consisting of sodium benzoate, sodium propionate, sodium bisulfite, methylparaben, and mixtures thereof, said preservative being present up to about 5% by weight of the total premixed formula, dry substance basis, and said premixed formula, including said preservative having a total moisture content prior to mixing with water of less than about 2%, dry substance basis.

4. The dietary supplement of claim 3, including a combination of the preservatives in the following proportions to each other, dry substance basis: sodium benzoate—29%; methylparaben—32.2%; sodium propionate—32.2%; and sodium bisulfite—6.6%.

5. The method of treating iron deficiency anemia, scours and post-parturition diseases of newborn pigs from birth to weaning comprising feeding said newborn pigs the premixed formula of claim 1 in an aqueous dispersion consisting of about 2–3 grams premixed formula to 100 milliliters water.

References Cited
UNITED STATES PATENTS 3,491,187   1/1970   Ely _____ 424—147

SAM ROSEN, Primary Examiner

U.S. Cl. X.R.
424—180, 295, 361